United States Patent [19]

Neyman et al.

[11] Patent Number: 4,724,753
[45] Date of Patent: Feb. 16, 1988

[54] BARBECUE APPARATUS

[76] Inventors: Dennis R. Neyman; Larry E. Neyman, both of 44 Via Los Ninos, Walnut Creek, Calif. 94596

[21] Appl. No.: 877,023

[22] Filed: Jun. 20, 1986

[51] Int. Cl.⁴ ............................................. A47J 33/00
[52] U.S. Cl. ........................................ 99/339; 99/419; 99/421 HV; 99/340; 99/447; 126/30; 126/9 R; 126/25 A
[58] Field of Search ............. 99/339, 340, 419, 421 R, 99/421 H, 421 HH, 447, 450; 126/9 R, 25 A, 30

[56] References Cited

U.S. PATENT DOCUMENTS

| | | | |
|---|---|---|---|
| 2,827,846 | 3/1958 | Karkling | 99/339 |
| 3,481,267 | 12/1969 | Saiki | 99/340 |
| 3,483,816 | 12/1969 | Lombardi | 99/421 |
| 3,583,307 | 6/1971 | Lee | 99/421 |
| 4,120,279 | 10/1978 | White | 99/340 |
| 4,495,860 | 1/1985 | Hitch et al. | 99/340 |
| 4,607,608 | 8/1986 | Allred et al. | 99/339 |

FOREIGN PATENT DOCUMENTS 2468346  5/1981  France ................................. 99/421

*Primary Examiner*—Henry S. Jaudon
*Attorney, Agent, or Firm*—Schapp and Hatch

[57] ABSTRACT

A barbecue apparatus having a vertical central post removably attached to a laterally extending base and having a plurality of vertically and radially offset transverse openings into which the ends of skewers laden with food may be inserted to position the skewers at the desired height. An auxiliary grill, fire pan, steam pan and smoker dome are provided, all of which are adjustably supported on the central post.

14 Claims, 6 Drawing Figures

U.S. Patent  Feb. 16, 1988  Sheet 1 of 2  4,724,753
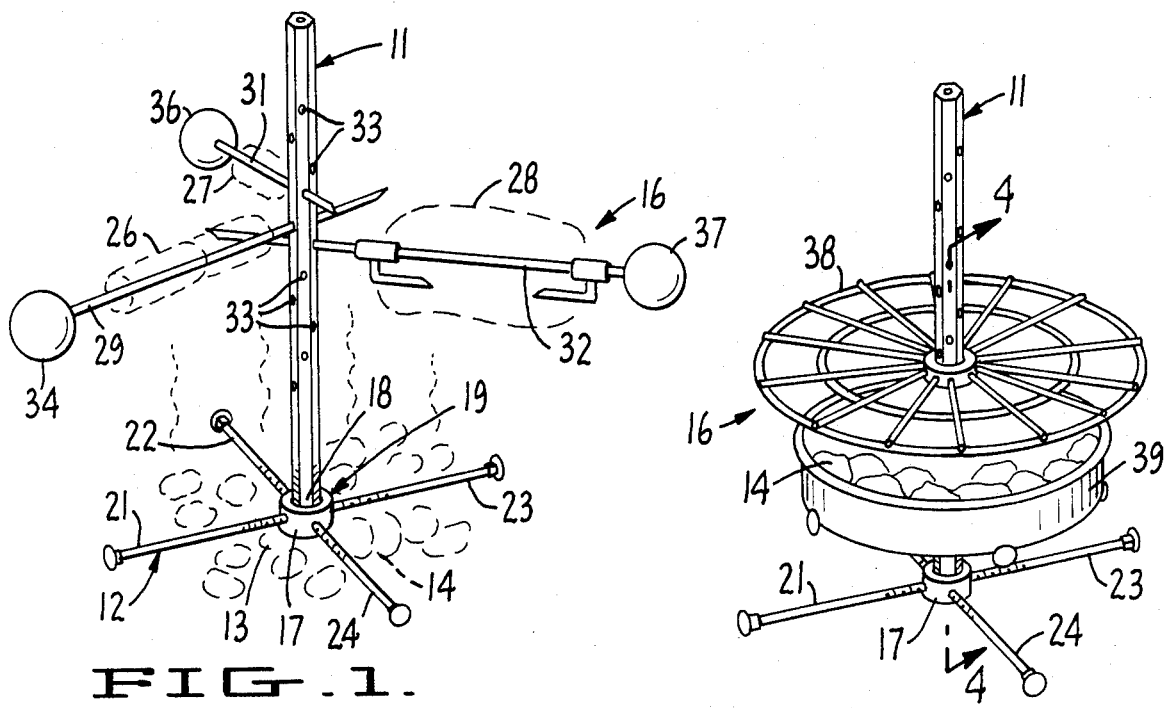
FIG. 1.
FIG. 2.
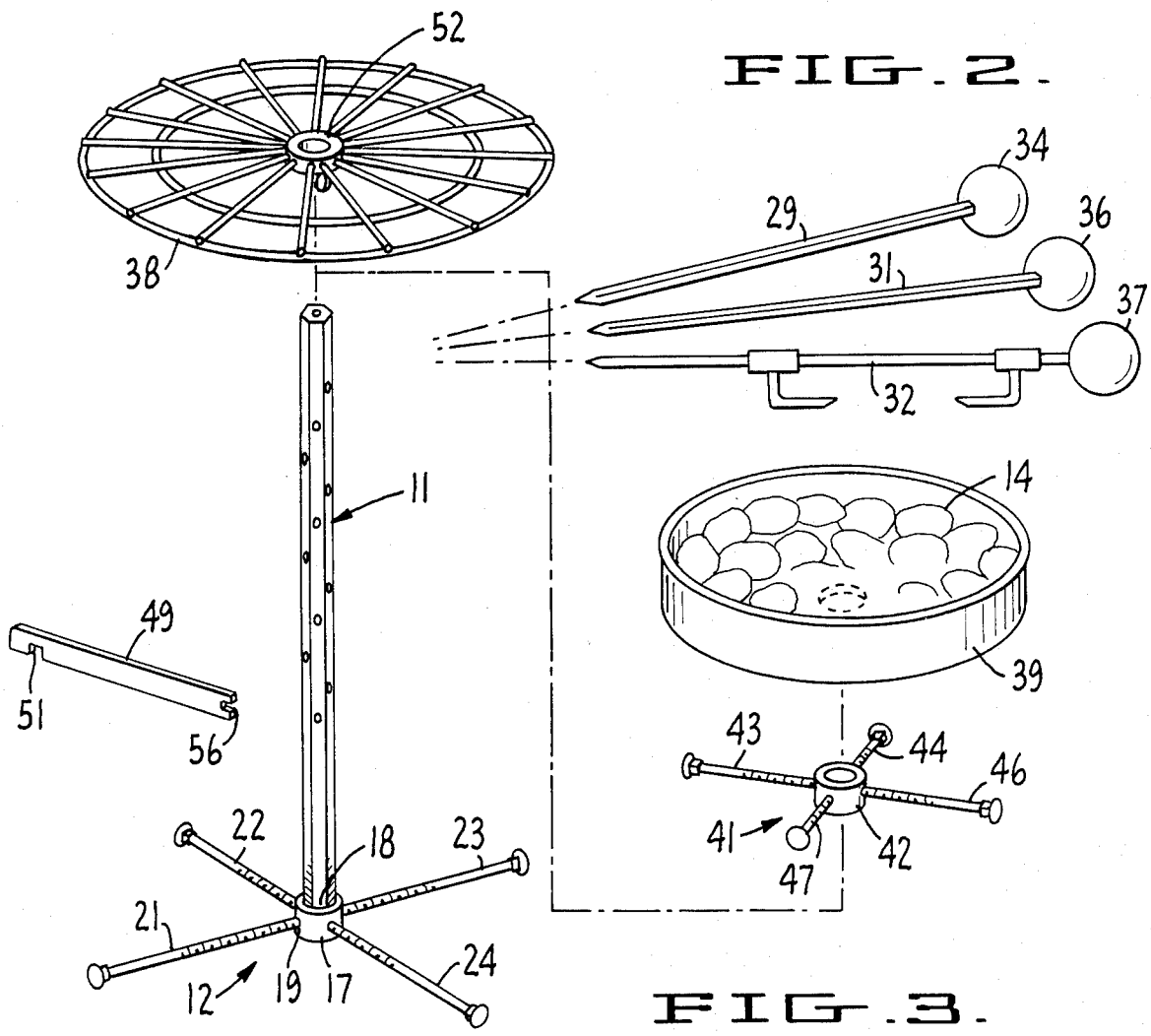
FIG. 3.

BARBECUE APPARATUS

BACKGROUND OF THE INVENTION

1. Field of the Invention

This invention relates to barbecue apparatus, and more particularly to apparatus for supporting grills and skewers at desired distances above a bed of charcoal embers.

2. Description of the Prior Art (The term "prior art" as used herein, or in any statement by or on behalf of applicant, means *only* that any document or thing referred to as prior art bears, directly or inferentially, a date which is earlier than the effective filing date hereof.)

Barbecue apparatus is widely known and used in the United States of America and in other countries. Typically, the barbecue apparatus comprises a pan mounted on legs or other supports and adapted to contain a layer or bed of glowing embers, usually from charcoal bricquets or chunks of charcoal. The food to be broiled is supported a spaced distance above the bed of glowing embers, often upon an open grill, and sometimes on skewers.

The heat from the glowing embers tends to be concentrated at the central portion of the grill, and it is difficult to position the food for optimum results. Many examples of existing barbecue apparatus are "portable", that is, they may be taken apart to a greater or lesser degree so as to occupy less space while being transported or stored. Because of the relatively large diameter of the fire pan and grill, even the dismounted apparatus requires considerable space.

It has been found that chunks of food can best be barbecued when impaled in a row upon a skewer. Many arrangements have been proposed for supporting such skewers in position for the food impaled thereon to be cooked. These schemes usually require considerable extra apparatus in order to regulate the distance between the glowing embers and the food to be cooked. Also, skewers supported upon or in place of an open grill tend to overcook the food overlying the center of the fire pan and undercook the skewered food near the outer edges of the fire pan.

It is believed that the patents listed below contain information which is typical of conventional barbecue apparatus and which is or might be considered to be material to the examination of this application.

U.S. Pat. No. D 202,157
U.S. Pat. No. 3,009,410
U.S. Pat. No. 3,297,166
U.S. Pat. No. 3,309,982
U.S. Pat. No. 3,741,103
U.S. Pat. No. 3,848,523
U.S. Pat. No. 4,380,190
Austrian Patent No. 167,890

These patents are believed to be relevant to the present invention because they were adduced by a prior art search made by an independent searcher.

A copy of each of the above-listed patents is supplied to the Patent and Trademark Office herewith.

No representation or admission is made that any of the above-listed documents is part of the prior art, in any acceptation of that term, or that no more pertinent information exists.

SUMMARY OF THE INVENTION

The barbecue apparatus of the present invention provides hitherto unknown versatility in the barbecuing of food, and hitherto unknown capability for easy assembly and disassembly for storage in limited space. This is accomplished in the present invention by mounting all of the parts on an upstanding central post. In its simplest form, a laterally extending base is attached to the post to keep it from tipping over and skewers are inserted through holes drilled diametrically through the post. The glowing embers are disposed in encircling relation to the lower end of the post, and the holes are drilled at different heights and different angular displacements in the post so that the skewers may be inserted at the desired height for obtaining best results.

Attachments are provided which are supported on the central post and which provide an open grill for foods which cook better on a grill. Another attachment is in the form of a shallow pan which can contain the coals at a desired height above the base. A steam pan removably and adjustably mountable on the center post is also provided, along with a smoke hood supported on the upper end of the post.

It is therefore an object of the present invention to provide a barbecue apparatus in which the various components are supported on a central post or tower.

Another object of the present invention is to provide a barbecue apparatus of the character described in which elongated, food-bearing skewers may be thrust through openings in the post at desired heights above a bed of coals and at desired angles to each other.

A further object of the present invention is to provide barbecue apparatus of the character described which may be completely disassembled for storage in a limited space, and which is adapted for easy reassembly ready for cooking.

A still further object of the present invention is to provide barbecue apparatus of the character described which is capable of broiling foods on skewers, on an open grill, and for smoke roasting, according to the desires of the user.

Other objects and features of advantage will become apparant as the specification progresses and from the claims.

BRIEF DESCRIPTION OF THE DRAWINGS FIG.

1 is a perspective view of the barbecue apparatus constructed in accordance with the present invention, with glowing embers and food impaled on skewers shown in phantom lines.

FIG. 2 is a view similar to that of FIG. 1, but showing the apparatus in a different configuration.

FIG. 3 is an exploded perspective view of the components of FIGS. 1 and 2 illustrating the mode of assembly and disassembly.

Figure 4:
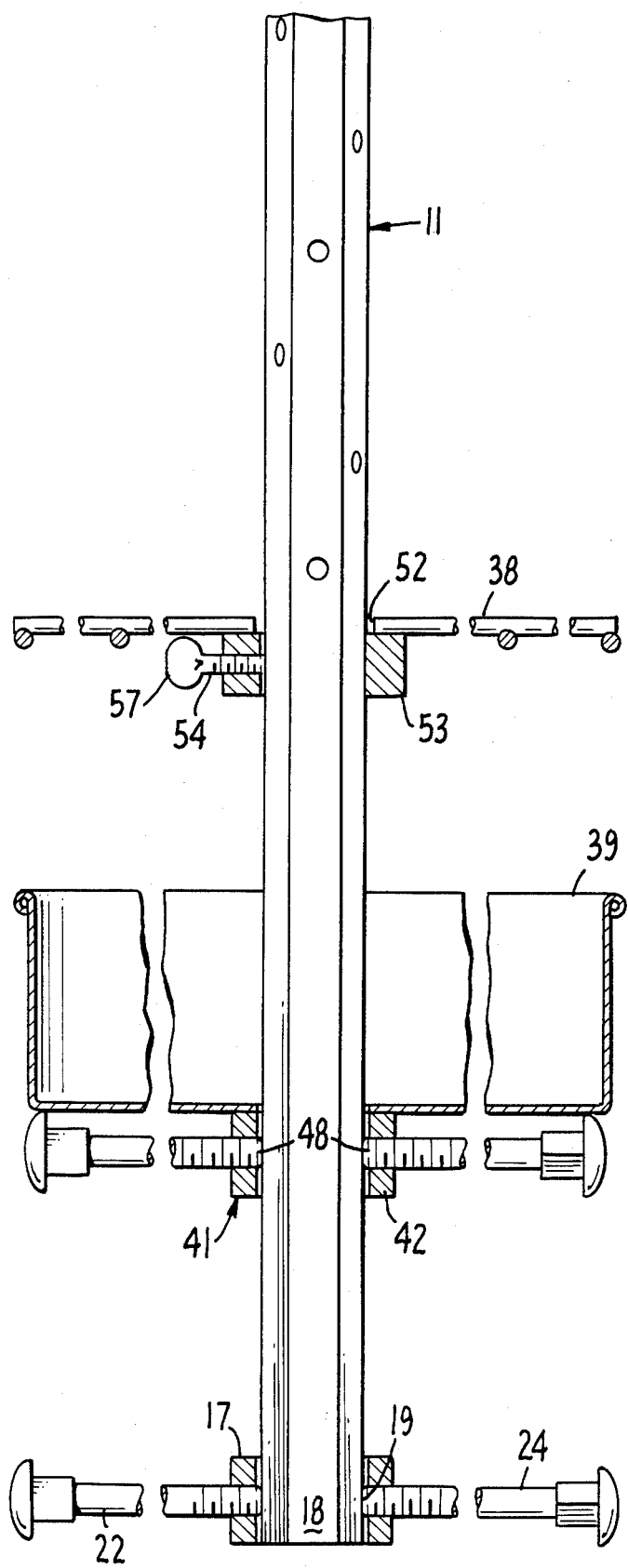
FIG. 4 is a vertical cross-sectional view on an enlarged scale taken substantially on the plane of Line 4—4 of FIG. 2.

While only the preferred forms of the invention are illustrated in the drawings, it will be apparent that various modifications could be made without departing from the ambit of the claims.

DESCRIPTION OF THE PREFERRED EMBODIMENTS

As may be seen in the accompanying drawings, the barbecue apparatus of the present invention provides a vertical post 11, a laterally extending base 12 secured to the post 11 at the lower end thereof for holding the post upright, fuel means 13 for providing burning embers 14 around the vertical post 11 and above the base 12, and food supporting means 16 carried by post 11 a spaced distance above base 12. As here shown, the vertical post 11 is constructed of a solid bar of metal, preferably of hexagonal cross section of uniform size over the length of the post.

The base 12 is selectively demountable from the vertical post 11, and is provided by a collar 17 slidable axially onto and off of the lower end 18 of post 11. Set screw means 19 is threadably engaged to collar 17 and engagable with the vertical post 11 for securing collar 17 thereto.

As here shown, a plurality of rods 21, 22, 23 and 24 are threadably attached to and extend radially from the central post 11 in circumferentially spaced relation. Conveniently, the set screw means 19 is provided by the inner ends of the rods 21 through 24 which may, as here illustrated, be in the form of elongated, headed bolts.

In accordance with the present invention, the burning coals 14 are positioned around the lower end 18 of the vertical post 11 and on top of the base 12 whereby heated gasses and products of combustion rise upwardly in an annular area surrounding the central, vertical post 11.

Under certain conditions of use, the base 12 merely rests on the ground with the coals resting on the ground and overlying the base, see FIG. 1. In this configuration, the food to be barbecued 26, 27 and 28 is impaled on skewers 29, 31 and 32 which then have their sharpened ends thrust through horizontal openings 33 formed transversely through the central post 11. The holes 33 are staggered both vertically and radially so that skewers supported therein will be held substantially level at desired heights above the embers 14, with the skewers 29 through 32 radiating at different angles from the post 11. Non-heat transferring handles 34, 36 and 37 are preferably mounted on the outer ends of the skewers 29 through 31 for facilitating and manipulating the skewers to be inserted through the holes 33 in center post 11.

In the form of the invention illustrated in FIG. 2 of the drawings, the food supporting means 16 takes the form of a circular open grill 38 suitable for broiling flat pieces of food such as steaks, chops, hamburger patties and pieces of chicken. In this configuration, the embers 14 are contained in an annular fire pan 39 in order to concentrate the cooking heat over the area of the grill. The fire pan 39 is supported at the desired height on post 11 by an adjustable support means 41 encircling post 11 and formed for locking thereto at the desired height.

The means 41 preferably is similar to base 12, but of smaller dimensions, and includes a collar 42 threadably engaged by radially extending rods or bolts 43, 44, 46 and 47. The collar 42 is slid to the desired height on central post 11 and the bolts 43, 44, 46 and/or 47 are rotated to move their ends inwardly into gripping engagment with the central post or tower 11. Since the means 41 may be hot from holding up the fire pan 39 full of embers 14, a bar 49 having a cut out portion 51 is provided to be used like a wrench on the bolts 43 through 47.

Grill 38 has an opening 52 at its center which is loosely slidable on the vertical post 11. Grill 38 is held at the desired height by a collar 53 which slides loosely on vertical post 11 and which is held in the desired position by a set screw 54. Bar 49 (FIG. 3 of the drawings) is also provided with an end notch 56 engagable with the flattened wing portion 57 of thumbscrew 54 for tightening and loosening the setscrew.

The basic configuration of FIG. 2 of the drawings is particularly well suited for use as a smoke oven simply by providing a bell-shaped dome 58 large enough to enclose the central post 11, fire pan 39, and annular grill 38. Preferably, and as here shown, the bottom edge 59 of dome 58 is spaced slightly above the surface on which base 12 reposes to provide for circulation of air. The dome 58 is carried on top of the vertical post 11 and is removably secured in place by an attaching means in the form of a thumbscrew 61 passing through an opening in the dome and threadably engaged in the upper end 62 of the central post 11.

Figure 5:
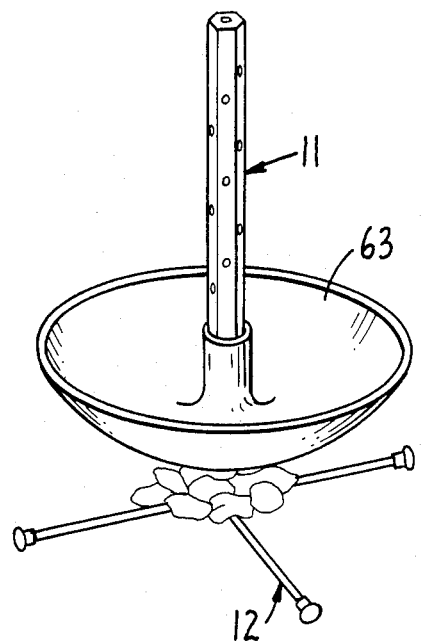
FIG. 5 is a view similar to that of FIG. 2, but illustrating another configuration of the apparatus.

In the form of the invention illustrated in FIG. 5 of the drawings, an annular steam pan 63 is provided for optional use with the dome 58. The steam pan 63 is positioned between fire pan 39 and grill 38 and is supported in the desired position by a collar (not shown) similar to the collar 53 which supports the grill 38.

In use, the present apparatus is extremely versatile. For example, the parts may be disassembled rather completely by removing grill 38, fire pan 39, steam pan 63 and skewers 29, 31 and 32 from the central post 11. The bolts 21-24 are unscrewed completely from the collar 17, and the bolts 43-47 are completely unscrewed from the collar 42. Thus disassembled, the parts can be stored in a long, narrow box and a flat, shallow square box.

The versatility of the present apparatus, arising from the central post construction, is also shown by the ease with which the various components are positioned relative to each other and to the glowing coals. Thus, the skewers can readily be positioned and repositioned by simply inserting them through the appropriate holes 33 in the central post 11. In its simplest form shown in FIG. 1, the apparatus can be disassembled and carried in a single, narrow box. All three types of barbecuing can be carried out with ease and facility simply by adding the grill 38 and its support, the fire pan 39 and its support, and steam pan 63 and its support, and the dome 58.

Figure 6:
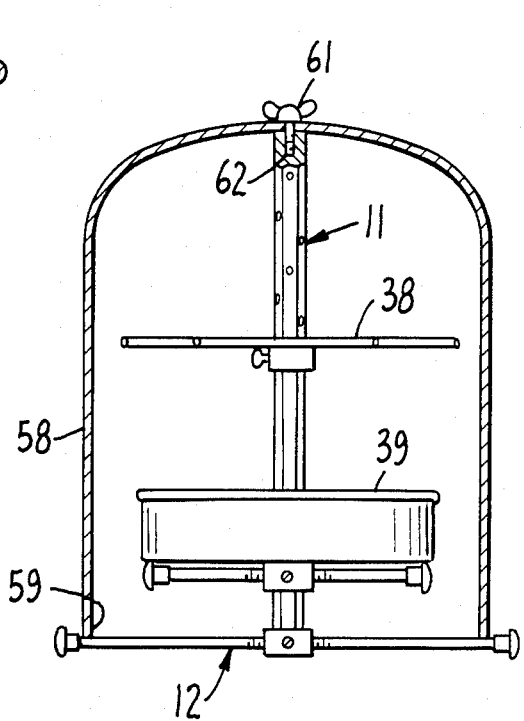
FIG. 6 is a vertical cross-sectional view showing a smoke hood mounted on the apparatus of FIG. 2.

The food can be cooked on the skewers 29-32, or on the grill 38, or on both. When oven roasting and/or smoking is desired, one simply removes the skewers and fastens the dome 58 in place in the manner shown in FIG. 6 of the drawings.

In view of the foregoing, it will be seen that the barbecue apparatus of the present invention involves a novel central post structure which gives rise to a number of advantages.

What is claimed is:
1. Barbecue apparatus, comprising:
   a vertical post;
   a laterally extending base secured to said post at the lower end thereof for holding said post upright;
   a heat source for providing burning embers evenly distributed around said vertical post and above said base; and
   food supporting means removably engaged with said post at variable heights above said base and formed for supporting food being barbecued in laterally balanced relation around said post and at desired heights above said base.

2. Barbecue apparatus as described in claim 1, and wherein said vertical post is constructed of a solid bar of metal.

3. Barbecue apparatus as described in claim 2, and wherein said vertical post is of solid hexagonal cross-section of uniform size over the length of the post and said food supporting means is removably engaged in a plurality of bores formed through said post in vertically spaced and circumferentially displaced relation to each other.

4. Barbecue apparatus as described in claim 1, and wherein said base is selectively demountable from said vertical post.

5. Barbecue apparatus as described in claim 4, and wherein said base comprises:
- a collar slidable axially onto and off of the lower end of said vertical post;
- set screw means in said collar engageable with said vertical post for securing said collar thereto; and
- a plurality of rods threadable attached to and extending radially from said collar.

6. Barbecue apparatus as described in claim 1, and wherein said heat source is formed for positioning burning coals around the lower end of said vertical post and on top of said base whereby heated products of combustion and gasses rise upwardly in an annular area surrounding said vertical post.

7. Barbecue apparatus as described in claim 6, and wherein said heat source comprises an annular pan formed for encircling said vertical post at desired positions along the height thereof, and adjustable support means for said annular pan is carried on said vertical post and is formed for locking thereto at said desired positions.

8. Barbecue apparatus as described in claim 1, and wherein said food supporting means comprises a plurality of elongated skewers formed for impaling pieces of food, and said vertical post is formed with a plurality of transverse bores of similar size formed for removably receiving the ends of said skewers.

9. Barbecue apparatus as described in claim 8, and wherein said transverse bores are staggered vertically in generally equal increments in said vertical post whereby said skewers are insertable at desired distances above said fuel supporting means for regulating heat.

10. Barbecue apparatus as described in claim 9, and wherein said transverse bores are angularly offset with regard to each other in generally equal increments whereby said skewers inserted in said bores radiate from said vertical post in laterally spaced relation to each other.

11. Barbecue apparatus as described in claim 8, and wherein said food supporting means further comprises an annular grill surrounding and supported by said vertical post, and an adjustable grill support means is formed for locking to said vertical post at desired heights for said grill above said burning embers.

12. Barbecue apparatus as described in claim 1, and wherein said apparatus further comprises an annular steam pan having a central opening loosely surrounding said vertical post and formed for containing a liquid, said steam pan being positionable over said embers to receive heat therefrom.

13. Barbecue apparatus, comprising:
- a vertical post;
- a laterally extending base secured to said post at the lower end thereof for holding said post upright;
- fuel means formed for providing burning embers around said vertical post and above said base;
- food supporting means carried by said post a spaced distance above said base;
- a bell-shaped smoke shroud carried on top of said vertical post,
- and attaching means formed for removably securing said smoke shroud to said vertical post in spaced relation to food supported thereby.

14. Barbecue apparatus comprising:
- a laterally extending base;
- a central upstanding post secured at its lower end to said base and having a plurality of openings formed transversely therethrough in vertically and circumferentially spaced relation to each other; and
- a plurality of elongated skewers selectively insertable in said openings for supporting such skewers at desired heights above said base and in desired angular relation to each other.

* * * * *